United States Patent
Yoshinari

(10) Patent No.: US 9,103,003 B2
(45) Date of Patent: Aug. 11, 2015

(54) NICKEL-BASED SUPERALLOY AND GAS TURBINE BLADE USING THE SAME

(75) Inventor: Akira Yoshinari, Hitachinaka (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 299 days.

(21) Appl. No.: 12/543,623

(22) Filed: Aug. 19, 2009

(65) Prior Publication Data

US 2010/0080730 A1 Apr. 1, 2010

(30) Foreign Application Priority Data

Sep. 30, 2008 (JP) .................................. 2008-252123

(51) Int. Cl.
*C22C 19/05* (2006.01)
*F01D 5/28* (2006.01)

(52) U.S. Cl.
CPC ................ *C22C 19/056* (2013.01); *F01D 5/28* (2013.01); *F05D 2300/175* (2013.01); *Y02T 50/671* (2013.01)

(58) Field of Classification Search
CPC ..................................................... C22C 19/056
USPC .................................................. 420/454, 441
See application file for complete search history.

(56) References Cited

U.S. PATENT DOCUMENTS

| | | | |
|---|---|---|---|
| 3,459,545 A | 8/1969 | Bieber et al. | |
| 3,615,376 A | 10/1971 | Ross et al. | |
| 3,650,635 A | * 3/1972 | Wachtell et al. | ............... 415/115 |
| 4,895,201 A | * 1/1990 | DeCrescente et al. | ........... 75/628 |
| 5,431,750 A | 7/1995 | Kawai et al. | |
| 5,489,194 A | * 2/1996 | Yoshinari et al. | .......... 416/241 R |
| 5,620,308 A | * 4/1997 | Yoshinari et al. | .......... 416/241 R |
| 6,416,596 B1 | 7/2002 | Wood et al. | |
| 6,428,637 B1 | 8/2002 | Wood et al. | |
| 2004/0221925 A1 | 11/2004 | Tamaki et al. | |

FOREIGN PATENT DOCUMENTS

| | | |
|---|---|---|
| AU | 708992 | 8/1999 |
| EP | 1 433 865 A1 | 6/2004 |
| EP | 1 433 865 B1 | 3/2006 |
| GB | 2 268 937 A | 1/1994 |
| JP | 46-027144 | 8/1971 |
| JP | 51-034819 | 3/1976 |
| JP | 06-057359 | 3/1994 |
| JP | 2004-197131 | 7/2004 |

OTHER PUBLICATIONS

EP Search Report of Appln. No. 09168257.5 dated Jan. 15, 2013 in English.

* cited by examiner

*Primary Examiner* — Jessee Roe
(74) *Attorney, Agent, or Firm* — Crowell & Moring LLP

(57) ABSTRACT

A Ni-based superalloy contains 13.1 to 16.0 percent by mass of Cr, 1.0 to 6.8 percent by mass of Co, 3.0 to 3.4 percent by mass of Al, 4.6 to 5.6 percent by mass of Ti, 2.0 to 4.4 percent by mass of Ta, 3.5 to 4.9 percent by mass of W, 0.1 to 0.9 percent by mass of Mo, 0.3 to 1.4 percent by mass of Nb, 0.05 to 0.20 percent by mass of C, and 0.01 to 0.03 percent by mass of B with the remainder being nickel and inevitable impurities. The superalloy excels in corrosion resistance, oxidation resistance, has high strength, and is used in parts of a gas turbine to be used at high temperature. The resulting gas turbine excels in durability.

8 Claims, 4 Drawing Sheets

NICKEL-BASED SUPERALLOY AND GAS TURBINE BLADE USING THE SAME

CLAIM OF PRIORITY

The present application claims priority from Japanese Patent application serial No. 2008-252123, filed on Sep. 30, 2008, the content of which is hereby incorporated by reference into this application.

BACKGROUND OF THE INVENTION

1. Field of the Invention

The present invention relates to Ni-based superalloys excellent in strength, hot corrosion resistance, and oxidation resistance each at high temperature. It also relates to parts or components, such as gas turbine blades, using the Ni-based superalloys.

2. Description of Related Art

In engines such as jet engines and gas turbines, turbine inlet temperature is being elevated higher and higher so as to increase performance and efficiency of the engines. Materials for use in turbine blades that should endure such elevated temperature are required to have excellent creep rupture strength and high toughness as to endure centrifugal force at high temperature, as well as excellent oxidation resistance and corrosion resistance to high-temperature combustion gas atmospheres. Ni-based alloys are presently used to satisfy these requirements. Ni-based alloys are roughly classified as conventional casting alloys containing equiaxis grains; uni-directional solidification alloys containing columnar grains; and single crystal alloys each containing a single crystal grain.

Conventional cast Ni-based alloys having high Cr contents are used in land based gas turbines (gas turbines that are fixed on the ground and used for power generation) using fuels containing large amounts of impurities in consideration of their hot corrosion resistance and cost. Exemplary alloys that are oriented to satisfactory corrosion resistance include conventional casting alloys disclosed typically in Document 1 (Japanese Patent Laid-open No. Sho 51-34819), Document 2 (Japanese Patent Laid-open No. 2004-197131), and Document 3 (U.S. Pat. No. 3,459,545). Concerning conventional casting alloys for use in land based gas turbines, there are alloys having higher strength while sacrificing their hot corrosion resistance, such as alloys disclosed in Document 4 (Japanese Examined Patent Publication No. Sho 46-27144) and Document 5 (Japanese Patent Laid-open No. Hei 06-57359).

The conventional casting alloys for use in the gas turbines are required to have further improved strength because they have lower strength than the uni-directional solidification alloys and the single crystal alloys.

The uni-directional solidification alloys and the single crystal alloys are mainly used in the jet engine blades and nozzles (vanes). Such alloys for use in the jet engine blades and the nozzles are oriented to higher strength and have higher creep rupture strength by containing Cr in a smaller content and containing large amounts of tungsten (W) and tantalum (Ta) that effectively contribute to solution hardening. The resulting alloys, however, are not suitable for land based gas turbines using fuels containing large amounts of impurities, because they are insufficient in hot corrosion resistance although they have high creep rupture strength. Additionally, these alloys show low casting yields because they require complicated casting processes.

Accordingly, an object of the present invention is to provide a Ni-based conventional casting alloy that excels in corrosion resistance and oxidation resistance and has high strength.

SUMMARY OF THE INVENTION

The object has been achieved according to the present invention by increasing chromium (Cr) and titanium (Ti) contents in a Ni-based alloy so as to improve its hot corrosion resistance. Such a higher titanium content, however, significantly impairs the oxidation resistance. To avoid this and to improve the oxidation resistance, a content of aluminum, which effectively contributes to improvement of the oxidation resistance, is increased to an upper limit at which no heterogeneous phase precipitates, and an amount of molybdenum (Mo), which adversely affects the oxidation resistance, is decreased. A lower molybdenum content, however, impairs high-temperature creep strength. Accordingly, a cobalt (Co) content is decreased but W and Ta contents are increased to corresponding amounts so as to maintain satisfactory high-temperature creep strength. Specifically, according to an embodiment of the present invention, there is provided a Ni-based superalloy which contains 13.1 to 16.0 percent by mass of Cr, 1.0 to 6.8 percent by mass of Co, 3.0 to 3.4 percent by mass of Al, 4.6 to 5.6 percent by mass of Ti, 2.0 to 4.4 percent by mass of Ta, 3.5 to 4.9 percent by mass of W, 0.1 to 0.9 percent by mass of Mo, 0.3 to 1.4 percent by mass of Nb, 0.05 to 0.20 percent by mass of C, and 0.01 to 0.03 percent by mass of B, with the remainder being nickel (Ni), and inevitable impurities. By controlling components as above, the resulting Ni-based superalloy has high strength, excels in corrosion resistance and oxidation resistance, and is thereby suitable as a material for members to be used at high temperature, such as gas turbine blades.

In a preferred embodiment, there is provided a Ni-based superalloy having high strength, excellent corrosion resistance, and superior oxidation resistance, which contains 13.6 to 15.5 percent by mass of Cr, 4.0 to 6.8 percent by mass of Co, 3.0 to 3.35 percent by mass of Al, 4.8 to 5.4 percent by mass of Ti, 2.5 to 4.0 percent by mass of Ta, 4.0 to 4.9 percent by mass of W, 0.5 to 0.9 percent by mass of Mo, 0.3 to 1.2 percent by mass of Nb, 0.10 to 0.18 percent by mass of C, and 0.01 to 0.02 percent by mass of B, with the remainder being nickel and inevitable impurities. In a more preferred embodiment, there is provided a Ni-based superalloy with high strength, excellent corrosion resistance, and superior oxidation resistance, which contains 13.6 to 14.5 percent by mass of Cr, 5.0 to 6.5 percent by mass of Co, 3.1 to 3.3 percent by mass of Al, 4.8 to 5.2 percent by mass of Ti, 3.0 to 4.0 percent by mass of Ta, 4.4 to 4.8 percent by mass of W, 0.6 to 0.8 percent by mass of Mo, 0.4 to 0.8 percent by mass of Nb, 0.12 to 0.16 percent by mass of C, and 0.01 to 0.02 percent by mass of B, with the remainder being nickel and inevitable impurities. By controlling the components within the above range, the superalloy as a material can have stable properties such as tensile strength, creep strength, and corrosion resistance/oxidation resistance, the resulting product has properties that vary less and thereby has improved reliance. Additionally, the product made from the superalloy can be designed so as to have, for example, a larger allowable stress and can thereby have improved performance.

The alloy composition may further contain hafnium (Hf), rhenium (Re), and/or zirconium (Zr). The contents of these elements, if added, are 0 to 2.0 percent by mass of Hf, 0 to 0.5 percent by mass of Re, and 0 to 0.05 percent by mass of Zr. The superalloy may contain more oxygen (O) and nitrogen (N) as impurities than inevitable amounts. In this case, the contents of these elements are 0 to 0.005 percent by mass of O and 0 to 0.005 percent by mass of N. When the superalloy further contains additional components, the contents of components of the superalloy are controlled by the composition of Ni and inevitable impurities.

In yet another embodiment according to the present invention, there is provided a casting using the Ni-based superalloy. Among such castings, the Ni-based superalloy is advantageously applied to gas turbine parts for use at high temperature, such as blades, nozzles, and shrouds (fan cowls). The gas turbine blades or nozzles according to the present invention excel especially in high-temperature strength, hot corrosion resistance, and hot oxidation resistance. They can therefore provide gas turbines with excellent durability and are suitable for use in land based gas turbines using fuels containing large amounts of impurities.

The Ni-based superalloys having these configurations are high and well balanced in hot corrosion resistance, hot oxidation resistance, and high-temperature creep rupture strength. These Ni-based superalloys, if applied to gas turbine blades, give products which are used typically as gas turbines using fuels containing large amounts of impurities and have high durability.

DETAILED DESCRIPTION OF THE PREFERRED EMBODIMENTS

Figure 4A:
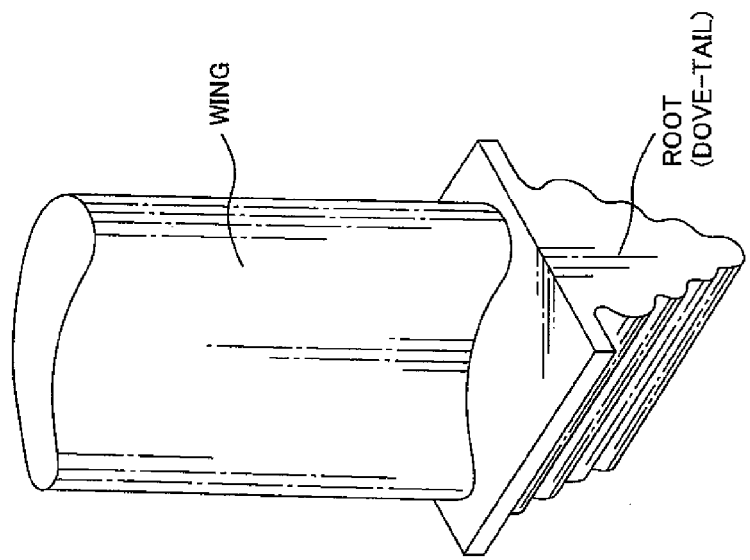
FIGS. 4A and 4B are views showing exemplary shapes of gas turbine blades.
Figure 4B:
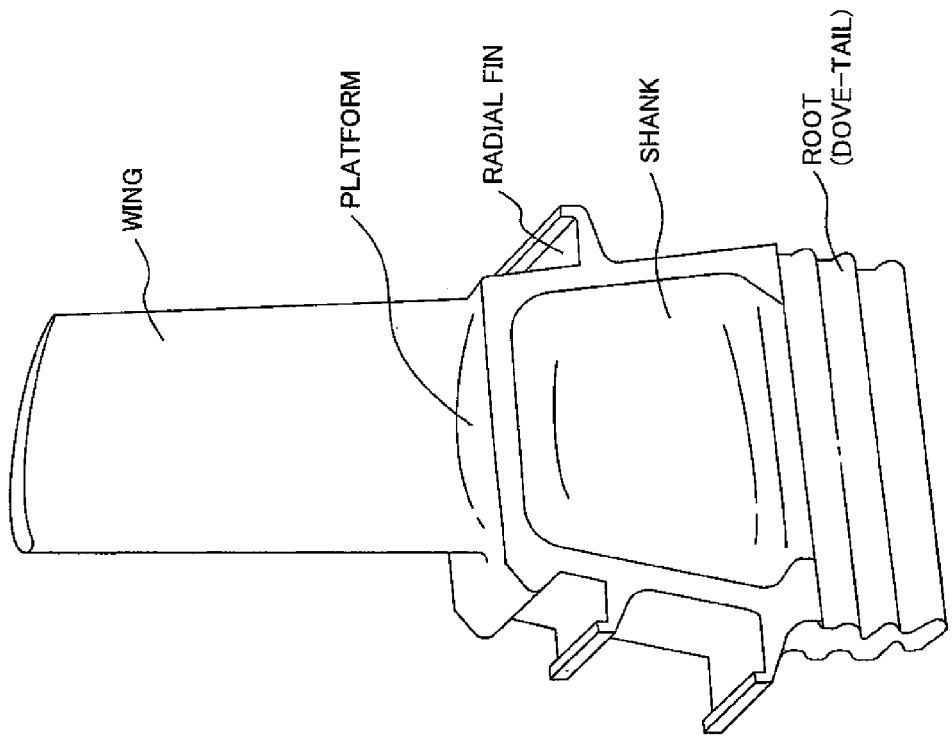

FIG. 4A shows an exemplary shape of an aircraft gas turbine blade; and FIG. 4B shows an exemplary shape of a land based gas turbine blade for power generation. Such land based gas turbine blade and aircraft gas turbine blade differ from each other in shape and size. The land based gas turbine blade includes a wing (a wing portion), a shank (a shank portion), and a root (a root portion or a dove-tail portion) and has a size of about 10 to 100 cm and a weight of about 1 to 10 kg. In contrast, the aircraft gas turbine blade includes a wing and a root (dove-tail) and has a smaller size of about 3 to 20 cm, a lighter weight of about 0.1 to 1 kg, and a thinner and longer shape than those of the land based blade. Different properties are required for materials for gas turbine blades and nozzles, and importance of the respective properties vary depending on service environment. Among such properties, tensile strength at room temperature, high-temperature tensile strength, high-temperature creep strength, hot corrosion resistance, and hot oxidation resistance are required as fundamental properties. Accordingly, it is one of important objects to develop alloy compositions for casting, which have these properties in good balance without including significantly inferior property or properties. We have made investigations on conventional casting alloys that can be improved both in corrosion resistance and oxidation resistance while maintaining satisfactory creep strength. The present invention has been made based on these investigations.

Uni-directional solidification alloys and single crystal alloys have been used to improve the strength. Such uni-directional solidification alloys and single crystal alloys are used in blades and nozzles of small-sized and light-weighted jet engines (aircraft gas turbines). In these alloys, the creep rupture strength is increased by containing large amounts of W and Ta, which effectively contribute to solution hardening, and by having a decreased Cr content so as to sacrifice the hot corrosion resistance. They have therefore insufficient hot corrosion resistance and hot oxidation resistance and are unsuitable as materials for land based gas turbines using fuels containing large amounts of impurities.

In addition, blades cast from such uni-directional solidification alloys and single crystal alloys are poor in casting yields in casting of blades because of their complicated casting processes. Among them, land based gas turbine blades have large and complicated dimensions (size and shape), thereby show very low casting yields, and result in very expensive products.

Such land based gas turbines are required to have low cost and satisfactory reliability, although they are not so required to have light weights. In addition, gas turbines for power generation are continuously used at shortest for about two or three years, whereas the jet engines are subjected to inspections and overhauls in brief periods of time.

Accordingly, common conventional cast Ni-based superalloys that are oriented to superior hot corrosion resistance have insufficient high-temperature strength, whereas Ni-based superalloys that are oriented to satisfactory strength have insufficient corrosion resistance and oxidation resistance. In short, strength and corrosion resistance/oxidation resistance are in trade-off in common Ni-based superalloys. Under these circumstances, the present invention has been made so as to improve hot corrosion resistance, especially resistance to molten salt corrosion, of Ni-based conventional casting alloys without sacrificing high-temperature creep rupture strength and hot oxidation resistance.

The compositions of superalloys according to the present invention are as above. Hereinafter functions and preferred compositional ranges of respective components of the Ni-based superalloys will be described below.

Cr: 13.1 to 16.0 Percent by Mass

Chromium (Cr) element is effective for improving hot corrosion resistance of the superalloy. Specifically, resistance to molten salt corrosion is effectively improved with an increasing Cr content. This effect is truly exhibited at a Cr content of 13.1 percent by mass or more. The superalloys according to the present invention, however, contain large amounts typically of Ti, W, and Ta, and if Cr is contained in an excessively large amount, it may cause precipitation of brittle topologically close packed phases (TCP phases) to significantly impair high-temperature strength and hot corrosion resistance. The upper limit of the Cr content should therefore be 16.0 percent by mass to take balance with other alloy elements. Within the specified compositional range, the Cr content is preferably from 13.6 to 15.5 percent by mass, and more preferably from 13.6 to 14.5 percent by mass, in consideration of balance between strength and corrosion resistance.

Co: 1.0 to 6.8 Percent by Mass

Cobalt (Co) element lowers the solvus temperature of γ' phase (intermetallic compound $Ni_3Al$ between Ni and Al) so as to facilitate a solution treatment, strengthens γ phase through solution hardening, and improves the hot corrosion resistance. These effects are found at a Co content of 1.0 percent by mass or more. In contrast, if the Co content is more than 6.8 percent by mass, the superalloys according to the present invention lose balance between Co and other alloy elements to suppress the precipitation of γ' phase to thereby lower the high-temperature strength because the superalloys contain added elements such as Ti, W, and Ta. The Co content should therefore be 6.8 percent by mass or less. Within the specified compositional range, the Co content is preferably from 4.0 to 6.8 percent by mass, and more preferably from 5.0 to 6.5 percent by mass, in consideration of balance between easiness of solution heat treatment and the strength.

W: 3.5 to 4.9 Percent by Mass

Tungsten (W) element dissolves in matrix γ phase and precipitated γ' phase as a solid solution so as to effectively increase the creep strength through solution hardening. To exhibit these advantages sufficiently, the W content should be 3.5 percent by mass or more. Tungsten, however, has a large specific gravity to increase the mass (weight) of the alloy and lowers the hot corrosion resistance of the alloy. Tungsten, if contained in a content of more than 4.9 percent by mass, precipitates as a needle-like α-W to lower the creep strength, hot corrosion resistance and toughness because the superalloys according to the present invention contain large amounts of Ti and Cr. The upper limit of the W content should therefore be 4.9 percent by mass. Within the specified compositional range, the W content is preferably from 4.0 to 4.9 percent by mass, and more preferably from 4.4 to 4.8 percent by mass, in consideration of balance among high-temperature strength, hot corrosion resistance, and stability of structure at high temperature.

Ta: 2.0 to 4.4 Percent by Mass

Tantalum (Ta) dissolves in γ' phase in the form of [$Ni_3$ (Al, Ta)], thus solution-hardening the superalloy so as to improve the creep strength. To attain the advantage sufficiently, the Ta content should be 2.0 percent by mass or more. In contrast, Ta, if its content is more than 4.4% by mass, becomes supersaturated to thereby precipitate as needle-like δ phase [Ni, Ta]. As a result, the alloy has lowered creep rupture strength. The upper limit of the Ta content should therefore be 4.4 percent by mass. Within the specified compositional range, the Ta content is preferably from 2.5 to 4.0 percent by mass, and more preferably from 3.0 to 4.0 percent by mass, in consideration of balance between strength and stability of structure at high temperature.

Tungsten (W) dissolves in matrix γ phase and precipitated γ' phase to increase the creep strength through solution hardening; and tantalum (Ta) dissolves in precipitated γ' phase to increase the creep strength through solution hardening. Accordingly, the combination addition of the two elements more effectively increases the creep strength as a synergistic effect, as compared with a single addition of either one of the two elements. It is therefore effective to specify the contents of Ta and W as a total content of Ta and W (Ta+W). To attain the synergistic effect sufficiently, the total content of Ta and W should be 6.0 percent by mass or more. However, the two elements, if their total content (Ta+W) be more than 9.2 percent by mass, become supersaturated to precipitate as needle-like α-W to thereby lower the creep strength. The upper limit of the total content should therefore be 9.2 percent by mass. Within the specified compositional range, the total content of Ta and W is preferably from 7.0 to 9.0 percent by mass and more preferably from 7.5 to 8.5 percent by mass, in consideration of balance between strength and stability of structure at high temperature.

Mo: 0.1 to 0.9 Percent by Mass

Molybdenum (Mo) has substantially the same effect as W and, where necessary, can be used instead of a part of W. The element also raises the solvus temperature of γ' phase to increase the creep strength, but it does not have so good effect as W does. To attain the effect, the Mo content should be 0.1 percent by mass or more. Molybdenum has a smaller specific gravity than that of W and thereby contributes to reduction in weight of the superalloy. In contrast, the element lowers the oxidation resistance and corrosion resistance of the superalloy, and the upper limit of its content, if added, should be 0.9 percent by mass. Within the specified compositional range, the Mo content is preferably from 0.5 to 0.9 percent by mass, and more preferably from 0.6 to 0.8 percent by mass, in consideration of balance among high-temperature strength, hot corrosion resistance, and hot oxidation resistance.

Ti: 4.6 to 5.6 Percent by Mass

Titanium (Ti) dissolves in γ' phase in the form of [$Ni_3$ (Al, Ta, Ti)] as with Ta, but it does not have so good effect as Ta does. Ti rather significantly effectively improves the hot corrosion resistance of the superalloy. To attain remarkable effect on the resistance to molten salt corrosion, the Ti content should be 4.6 percent by mass or more. However, Ti, if in a content of more than 5.6 percent by mass, considerably impairs the oxidation resistance and causes precipitation of brittle η phase. The upper limit of the Ti content should therefore be 5.6 percent by mass. The Ti content is preferably from 4.8 to 5.4 percent by mass, and more preferably from 4.8 to 5.2 percent by mass, in consideration of balance among high-temperature strength, hot corrosion resistance, and hot oxidation resistance in the superalloys according to the present invention containing a large amount (13.1 to 16.0 percent by mass) of Cr.

Al: 3.0 to 3.4 Percent by Mass

Al is an element for mainly constituting the γ' precipitation strengthening phase, i.e. $Ni_3Al$ that improves the creep rupture strength. The element also remarkably improves the oxidation resistance. To attain these advantages sufficiently, the Al content should be 3.0 percent by mass or more. The element, if its content is more than 3.4 percent by mass, causes excessive precipitation of γ' phase [$Ni_3$ (Al, Ta, Ti)] to lower the strength contrarily, and the element forms a multicomponent oxide with chromium to impair the hot corrosion resistance. This is because the superalloys according to the present invention contain large amounts of Cr, Ti, and Ta. The Al content should therefore be from 3.0 to 3.4 percent by mass. Within the specified compositional range, the Al content is preferably from 3.0 to 3.35 percent by mass, and more preferably from 3.1 to 3.3 percent by mass, in consideration of balance among high-temperature strength, hot oxidation resistance, and hot corrosion resistance.

Nb: 0 to 1.4 Percent by Mass

Niobium (Nb) dissolves in γ' phase in the form of [$Ni_3$ (Al, Nb, Ti)] to solution-harden the matrix more effectively than Ti does. The element also improves the hot corrosion resistance, but it does not have such an effect as Ti does. In order to attain solution hardening at high temperature, at least 0.3 percent by mass of Nb is required. However, the element, if in a content of more than 1.4 percent by mass, causes precipitation of brittle η phase to significantly lower the strength in the superalloys according to the present invention containing a large amount of Ti. The upper limit of its content should therefore be 1.4 percent by mass. If superior hot corrosion resistance is required for the superalloys according to the present invention, the hot corrosion resistance can further be improved by adding no Nb but adding Ti in a larger amount corresponding to the Nb content. In regular cases, the Nb content is preferably from 0.3 to 1.2 percent by mass, and more preferably from 0.4 to 0.8 percent by mass, in consideration of balance among high-temperature strength, hot corrosion resistance and hot oxidation resistance.

Accordingly, Ni-based superalloys containing specific amounts of the respective components, with the remainder being Ni and inevitable impurities, excel in high-temperature strength, hot oxidation resistance and hot corrosion resistance. Specifically, they contain 13.1 to 16.0 percent by mass of Cr, 1.0 to 6.8 percent by mass of Co, 3.0 to 3.4 percent by mass of Al, 4.6 to 5.6 percent by mass of Ti, 2.0 to 4.4 percent by mass of Ta, 3.5 to 4.9 percent by mass of W, 0.1 to 0.9 percent by mass of Mo, 0.3 to 1.4 percent by mass of Nb, 0.05 to 0.20 percent by mass of C, and 0.01 to 0.03 percent by mass of B. The Ni-based superalloys have well-balanced corrosion resistance, oxidation resistance, and creep rupture strength each at high temperature and especially excel in resistance to molten salt corrosion. When used in power engines, such as gas turbines, using fuels containing large amounts of impurities, they sufficiently endure their service environments and contribute to superior corrosion resistance and oxidation resistance of the power engines. When used in land based gas turbines using fuels containing large amounts of impurities, they enable the gas turbines to operate at higher combustion gas temperature to thereby improve the thermal efficiency.

Such Ni-based superalloys containing the components within the above-specified compositional ranges may further contain Hf, Re, C, B, Zr, and/or O as appropriate. A superalloy according to a preferred embodiment contains, in addition to the above components, 0 to 2.0 percent by mass of Hf, 0 to 0.5 percent by mass of Re, 0 to 0.05 percent by mass of Zr, 0 to 0.005 percent by mass of O, and 0 to 0.005 percent by mass of N, with the remainder being Ni and inevitable impurities.

Hf: 0 to 2.0 Percent by Mass

Hafnium (Hf) does not significantly serve to strengthen the superalloy, but it has a function of improving hot corrosion resistance and hot oxidation resistance. That is, it improves adhesion of a protecting oxide layer typically of $Cr_2O_3$ or $Al_2O_3$ formed on the surface of the superalloy. The adhesion of the protecting oxide layer increases with an increasing content of Hf. However, since the superalloys according to the present invention contain Ti in a large amount of 4.6 to 5.6 percent by mass, Hf, if contained in a content of more than 2.0 percent by mass, causes large amounts of eutectic [$Ni_3$ (Hf, Ti)], to thereby significantly lower the melting point of the Ni-based superalloy and to impede solution heat treatment. The upper limit of the Hf content should therefore be 2.0 percent by mass. The Hf content in the superalloys according to the present invention is preferably 0.1% percent by mass or less, and more preferably substantially no Hf is added.

Re: 0 to 0.5 Percent by Mass

Rhenium (Re) can be contained instead of a part of W according to necessity. The element dissolves in matrix γ phase to increase the creep strength through solution hardening and is effective for improving the corrosion resistance of the superalloy. The element, however, is expensive and has a large specific gravity to increase the specific gravity of the superalloy. In the superalloys according to the present invention containing a large amount (13.1 to 16.0 percent by mass) of Cr, if Re is contained in a content of more than 0.5 percent by mass, it promotes the precipitation of needle-like α-W or α-Re (Mo) to thereby lower the creep strength and toughness. The upper limit of the Re content should therefore be 0.5% percent by mass. The Re content is preferably 0.1% percent by mass or less, and more preferably substantially no Re is added in the superalloys according to the present invention.

C: 0.05 to 0.2 Percent by Mass

Carbon (C) segregates at grain boundaries to strengthen the grain boundaries; and part of the element forms carbides such as TiC and TaC and precipitates as lumps. At least 0.05 percent by mass of carbon is required to segregate at grain boundaries to thereby strengthen the grain boundaries. Carbon, if in a content of more than 0.2 percent by mass, forms excessive carbides to lower the creep strength and ductility at high temperature, and hot corrosion resistance as well. The upper limit of the C content should therefore be 0.2 percent by mass. Within the specified compositional range, the C content is preferably from 0.10 to 0.18 percent by mass, and more preferably from 0.12 to 0.16 percent by mass, in consideration of balance among strength, ductility, and corrosion resistance.

B: 0.005 to 0.03 Percent by Mass

Boron (B) segregates at grain boundaries to strengthen the grain boundaries, and a part of it forms borides [$(Cr, Ni, Ti, Mo)_3B_2$] that precipitate at grain boundaries. In order to effect segregation at grain boundaries to thereby strengthen the grain boundaries, at least 0.005 percent by mass of B is required. However, the borides have remarkably low melting points than that of the superalloy and thereby lower the melting point of the superalloy and narrow the range of solid-solution heat treatment temperature. The upper limit of the B content should therefore be 0.03 percent by mass. Within the specified compositional range, the B content is preferably 0.01 to 0.02 percent by mass in consideration of balance between strength and solution heat treatment applicability.

Zr: 0 to 0.05 Percent by Mass

Zirconium (Zr) segregates at grain boundaries to strengthen the grain boundaries, but most of it forms an intermetallic compound [$Ni_3Zr$] at grain boundaries with the main component nickel. The intermetallic compound lowers the ductility of the superalloy and it has a remarkably low melting point to thereby lower the melting point of the superalloy, which leads to a narrow solid-solution treatment range. Thus, Zr has harmful effects and the upper limit of its content should be 0.05 percent by mass. In the superalloys according to the present invention, the Zr content is preferably 0.03 percent by mass or less, and more preferably 0.01 percent by mass or less which means that substantially no Zr is added.

O: 0 to 0.005 Percent by Mass and N: 0 to 0.005 Percent by Mass

Oxygen (O) and nitrogen (N) elements are impurities and are generally introduced from alloy raw materials. Oxygen is also introduced from a crucible. These elements are present in the superalloy as lumps of oxides ($Al_2O_3$) and nitrides (TiN or AlN). If these compounds are present in castings, they become starting points of cracks during creep deformation, to thereby lower the creep rupture strength or to be a cause of fatigue cracks to shorten the fatigue life. Particularly, oxygen appears as surface defects in the surface of castings to lower the yields of castings. Accordingly, these elements should be as little as possible. However, it is difficult to reduce their contents to zero in actual ingots, and the upper limits of their contents should be 0.005 percent by mass within which properties of the superalloy are not significantly impaired.

[First Embodiment]

Table 1 shows chemical compositions of Embodiment Alloys A1 to A12; and Table 2 shows chemical compositions of Comparative Alloys B1 to B10 , and Known Alloys C1 to C4 . Known Alloys C1, C2 , C3 , and C4 are the alloys disclosed in Document 2 , Document 4 , Document 1 and Document 5 , respectively.

TABLE 1

| Category | Alloy Number | Cr | Co | Ti | Al | Mo | W | Ta | Nb | Hf | Re | P | S | C | B | O | N | Ni |
|---|---|---|---|---|---|---|---|---|---|---|---|---|---|---|---|---|---|---|
| Embodiment Alloy | A1 | 14.05 | 5.00 | 5.12 | 3.20 | 0.40 | 4.80 | 3.88 | 0.81 | <0.01 | <0.1 | 0.003 | 0.005 | 0.13 | 0.014 | 0.002 | 0.002 | 62.58 |
| | A2 | 14.07 | 6.30 | 5.02 | 3.12 | 0.88 | 4.79 | 3.00 | 0.77 | <0.01 | <0.1 | 0.003 | 0.003 | 0.13 | 0.014 | 0.003 | 0.002 | 61.90 |
| | A3 | 14.00 | 6.00 | 5.13 | 3.30 | 0.66 | 4.72 | 3.40 | 0.75 | <0.01 | <0.1 | 0.004 | 0.004 | 0.13 | 0.014 | 0.002 | 0.003 | 61.88 |
| | A4 | 13.60 | 6.02 | 4.84 | 3.22 | 0.65 | 4.00 | 3.55 | 1.25 | <0.01 | <0.1 | 0.004 | 0.004 | 0.14 | 0.016 | 0.002 | 0.003 | 62.70 |
| | A5 | 13.90 | 5.95 | 4.89 | 3.15 | 0.61 | 4.42 | 3.48 | 0.84 | <0.01 | <0.1 | 0.003 | 0.004 | 0.14 | 0.015 | 0.002 | 0.002 | 62.59 |
| | A6 | 14.10 | 5.96 | 4.98 | 3.17 | 0.80 | 3.70 | 4.20 | 0.81 | <0.01 | <0.1 | 0.004 | 0.004 | 0.15 | 0.015 | 0.003 | 0.003 | 62.10 |
| | A7 | 14.01 | 6.50 | 5.01 | 3.30 | 0.78 | 4.52 | 3.04 | 0.80 | <0.01 | <0.1 | 0.003 | 0.005 | 0.14 | 0.014 | 0.003 | 0.002 | 61.87 |
| | A8 | 13.70 | 6.00 | 5.20 | 3.11 | 0.75 | 4.20 | 3.52 | 0.43 | <0.01 | <0.1 | 0.004 | 0.004 | 0.14 | 0.015 | 0.002 | 0.002 | 62.92 |
| | A9 | 13.92 | 6.07 | 4.99 | 3.12 | 0.50 | 4.75 | 3.34 | 0.79 | <0.01 | <0.1 | 0.003 | 0.005 | 0.15 | 0.014 | 0.003 | 0.003 | 62.34 |
| | A10 | 14.40 | 5.40 | 4.81 | 3.16 | 0.66 | 3.80 | 4.30 | 1.10 | <0.01 | <0.1 | 0.004 | 0.004 | 0.15 | 0.015 | 0.002 | 0.002 | 62.19 |
| | A11 | 13.60 | 5.50 | 5.40 | 3.30 | 0.35 | 4.85 | 4.20 | 0.35 | 0.70 | <0.1 | 0.004 | 0.004 | 0.15 | 0.015 | 0.002 | 0.002 | 61.57 |
| | A12 | 13.82 | 5.70 | 4.85 | 3.20 | 0.75 | 4.40 | 3.40 | 0.50 | 1.40 | <0.1 | 0.004 | 0.004 | 0.15 | 0.015 | 0.002 | 0.002 | 61.80 |

TABLE 2

| Category | Alloy Number | Cr | Co | Ti | Al | Mo | W | Ta | Nb | Hf | Re | P | S | C | B | O | N | Ni |
|---|---|---|---|---|---|---|---|---|---|---|---|---|---|---|---|---|---|---|
| Comparative Alloy | B1 | 14.21 | 5.83 | 4.43 | 3.14 | 0.80 | 4.56 | 3.21 | 0.71 | <0.01 | <0.01 | 0.003 | 0.004 | 0.15 | 0.014 | 0.002 | 0.002 | 62.94 |
| | B2 | 14.09 | 4.55 | 5.14 | 3.55 | 0.67 | 4.49 | 3.63 | 0.66 | <0.01 | <0.01 | 0.004 | 0.003 | 0.13 | 0.016 | 0.002 | 0.002 | 63.06 |
| | B3 | 13.97 | 6.42 | 5.41 | 3.14 | 0.66 | 4.47 | 3.87 | 0.73 | <0.01 | <0.01 | 0.002 | 0.005 | 0.14 | 0.013 | 0.002 | 0.003 | 61.17 |
| | B4 | 13.65 | 6.32 | 5.08 | 2.90 | 0.61 | 4.37 | 3.43 | 0.68 | <0.01 | <0.01 | 0.002 | 0.004 | 0.14 | 0.013 | 0.003 | 0.003 | 62.80 |
| | B5 | 14.26 | 6.17 | 5.13 | 3.26 | 1.24 | 4.42 | 3.53 | 0.89 | <0.01 | <0.01 | 0.002 | 0.005 | 0.14 | 0.017 | 0.003 | 0.002 | 60.93 |
| | B6 | 14.04 | 5.66 | 5.09 | 3.14 | 0.74 | 3.34 | 4.40 | 0.91 | <0.01 | <0.01 | 0.003 | 0.005 | 0.14 | 0.015 | 0.002 | 0.002 | 62.51 |
| | B7 | 14.10 | 5.77 | 4.82 | 3.30 | 0.78 | 4.69 | 4.83 | 0.84 | <0.01 | <0.01 | 0.003 | 0.004 | 0.14 | 0.015 | 0.003 | 0.002 | 60.70 |
| | B8 | 13.79 | 5.97 | 5.12 | 3.24 | 1.80 | 4.38 | 3.54 | 0.82 | <0.01 | <0.01 | 0.002 | 0.004 | 0.15 | 0.016 | 0.003 | 0.002 | 61.16 |
| | B9 | 14.12 | 6.47 | 4.86 | 3.30 | 0.79 | 4.45 | 1.82 | 0.64 | <0.01 | <0.01 | 0.004 | 0.005 | 0.14 | 0.014 | 0.002 | 0.003 | 63.38 |
| | B10 | 14.21 | 5.97 | 4.88 | 3.12 | 0.79 | 5.21 | 3.30 | 0.94 | <0.01 | <0.01 | 0.003 | 0.005 | 0.13 | 0.015 | 0.003 | 0.003 | 61.42 |
| Known Alloy | C1 | 13.80 | 6.83 | 3.30 | 4.00 | 1.85 | 4.00 | 2.80 | 1.15 | <0.01 | 0.002 | 0.004 | 0.005 | 0.10 | 0.015 | 0.002 | 0.003 | 62.14 |
| | C2 | 14.07 | 9.20 | 5.03 | 3.03 | 3.96 | 3.92 | 0.00 | 0.00 | 0.00 | 0.006 | 0.004 | 0.005 | 0.12 | 0.015 | 0.001 | 0.003 | 60.64 |
| | C3 | 14.18 | 10.11 | 4.76 | 2.95 | 1.50 | 3.84 | 2.79 | 0.00 | 0.09 | 0.008 | 0.004 | 0.004 | 0.08 | 0.010 | 0.001 | 0.002 | 59.67 |
| | C4 | 13.24 | 10.10 | 2.67 | 4.02 | 1.52 | 4.33 | 4.74 | 0.00 | 0.01 | 0.007 | 0.004 | 0.005 | 0.10 | 0.015 | 0.002 | 0.003 | 59.23 |

Each alloy was prepared by melting and casting materials using a vacuum induction furnace with a 12-kg refractory crucible, and ingots having a diameter of 80 mm and a length of 300 mm was formed thereby. Then, the ingots were melted in vacuum in an alumina crucible and cast in a ceramic mold heated at 1000° C. to give a series of test pieces having a diameter of 20 mm and a length of 150 mm. After casting, solution heat treatment and aging heat treatment of the test pieces were carried out under conditions given in Table 3.

TABLE 3

| Category | No. | Solution condition | Aging condition | | |
|---|---|---|---|---|---|
| | | | First aging | Second aging | Third aging |
| Embodiment Alloy | A1-A12 | 1480 K/2 h AC | 1366 K/4 h AC | 1325 K/4 h AC | 1116 K/16 h AC |
| Comparative Alloy | B1-B10 | 1480 K/2 h AC | 1366 K/4 h AC | 1325 K/4 h AC | 1116 K/16 h AC |
| Known Alloy | C1 | 1480 K/2 h AC | 1366 K/4 h AC | 1325 K/4 h AC | 1116 K/16 h AC |
| | C2 | 1480 K/2 h AC | 1366 K/4 h AC | 1325 K/4 h AC | 1116 K/16 h AC |
| | C3 | — | 1395 K/2 h | 1116 K/24 h AC | — |
| | C4 | 1480 K/4 h FC | 1395 K/2 h | 1116 K/24 h AC | — |

The following test pieces were cut from the test pieces after heat treatments by machining. They are test pieces for creep rupture tests each having a gauge diameter of 6.0 mm and a gauge length of 30 mm, test pieces for high temperature oxidation tests each having a length of 25 mm, a width of 10 mm and a thickness of 1.5 mm, and cubic test pieces for high temperature corrosion tests each having a length of 15 mm, a width of 15 mm and a height of 15 mm. Microstructure of each test piece was examined with a scanning electron microscope (SEM) to evaluate stability of the alloy structure.

Table 4 shows test conditions for evaluation of properties of the test pieces. Creep rupture tests were conducted under the conditions at 1255 K and 138 MPa. High-temperature oxidation tests were conducted under the condition at 1423 K for 20 hours, which was repeated a total of 10 times to measure a weight change. High-temperature corrosion tests were performed by immersing the test pieces in a molten salt at 850° C. having a composition of 75% of $Na_2SO_4$ and 25% of NaCl for 20 hours, which was repeated a total of 3 times (for a total of 60 hours) to measure a weight change.

TABLE 4

| Evaluation tests | Details of tests |
|---|---|
| Creep rupture test | Test temperature and stress (1) 1255 K-138 MPa |
| Oxidation test | Repeating oxidation tests in atmosphere (1)1423 K-200 h(20 h × 10 times) |
| Corrosion test | Immersion test in molten salt (1)1123 K-60 h(20 h × 3 times) *$Na_2SO_4$: 75%, NaCl: 25% |

Figure 1:
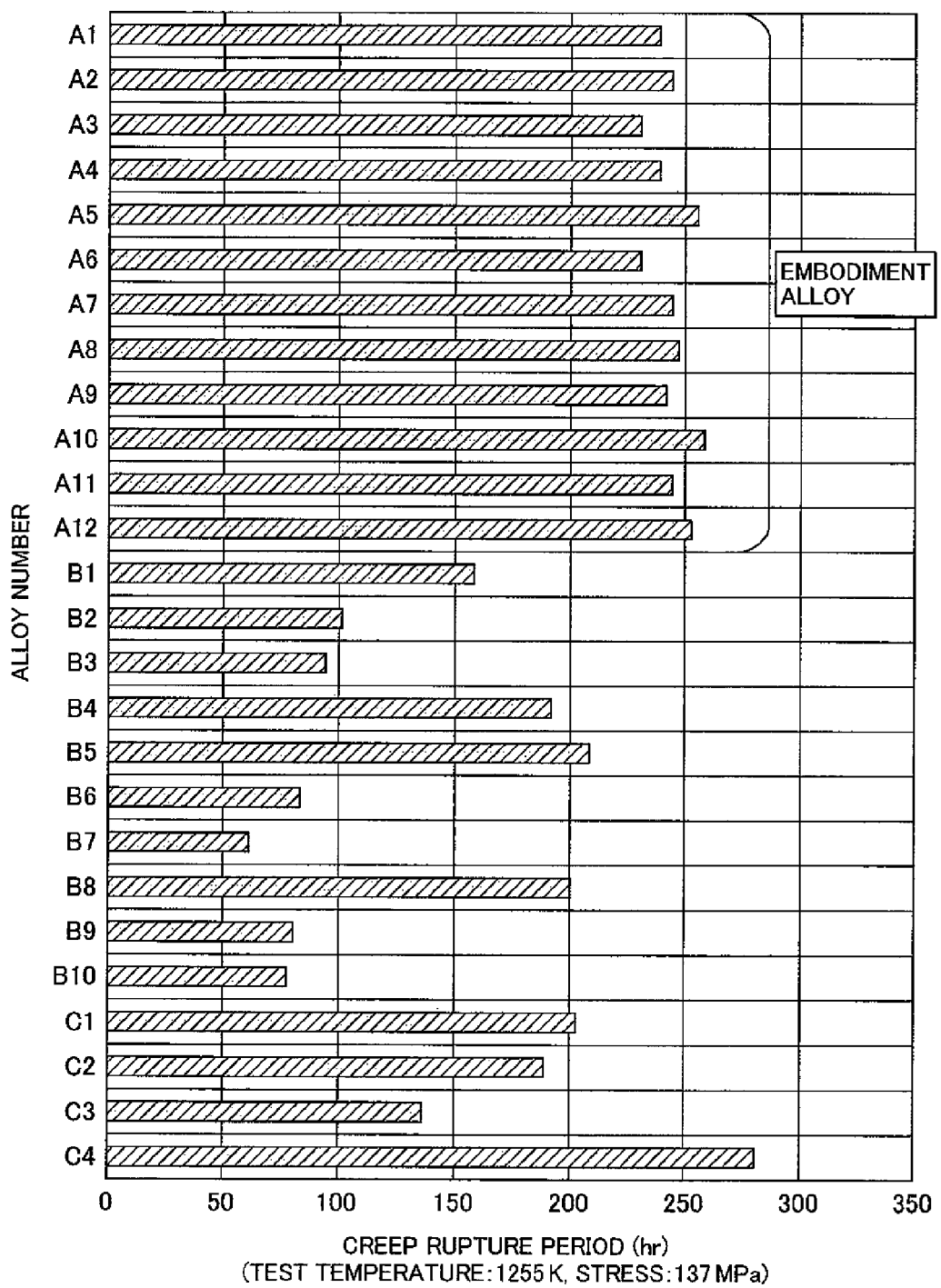
FIG. 1 is a graph showing creep rupture periods of alloy test pieces.
Figure 2:
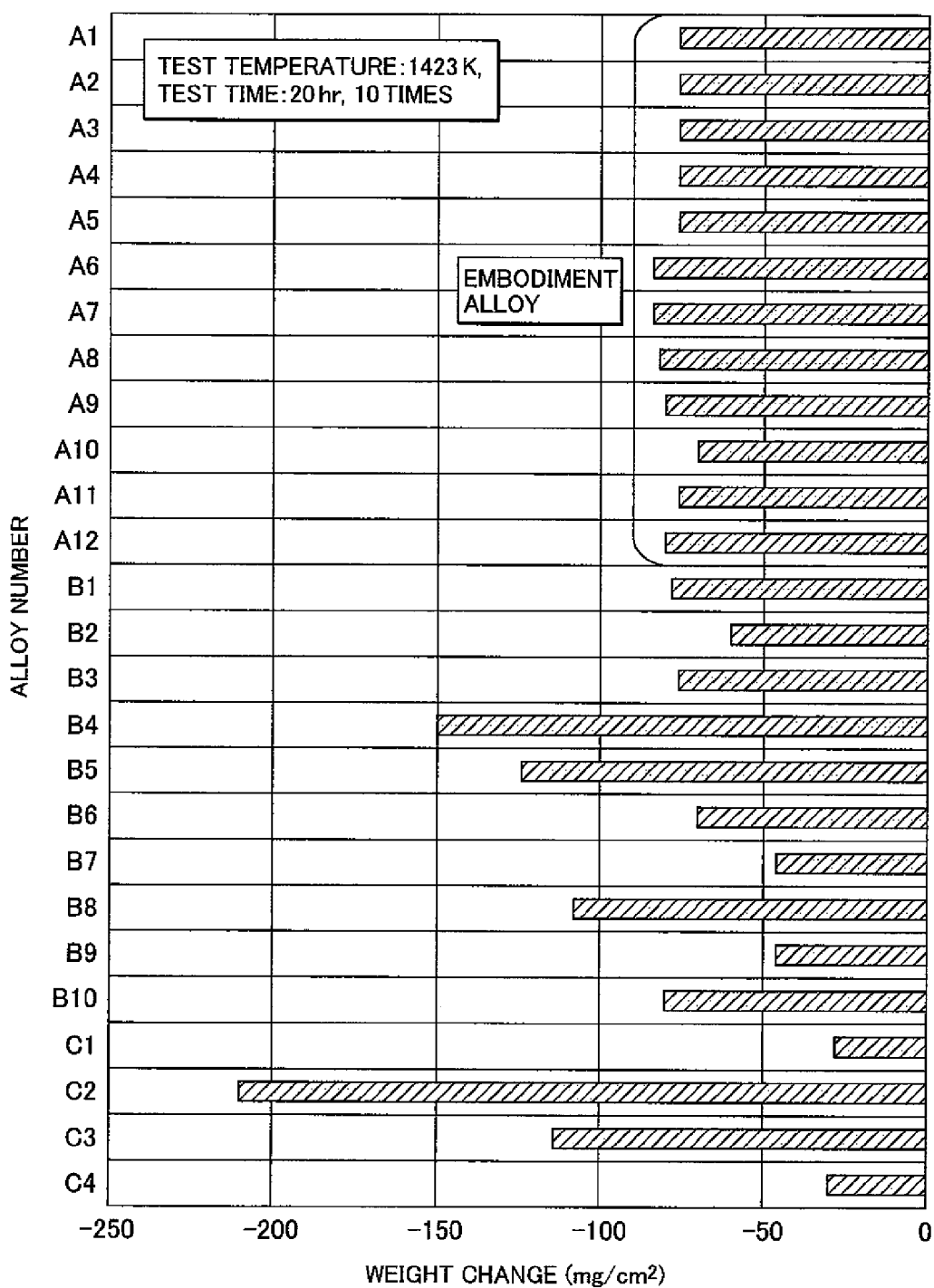
FIG. 2 is a graph showing oxidation losses of alloy test pieces in high-temperature oxidation test.
Figure 3:
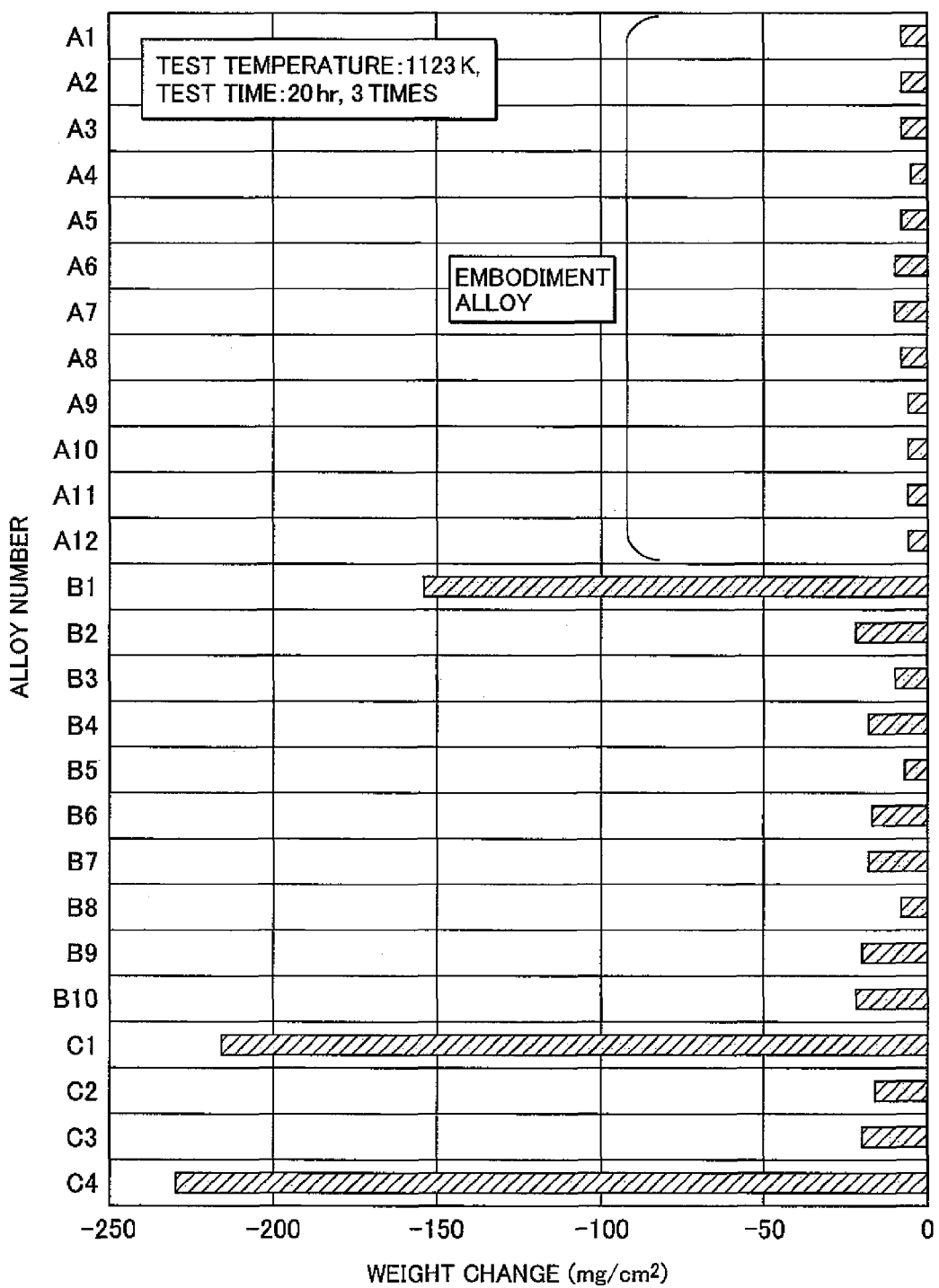
FIG. 3 is a graph showing corrosion losses of alloy test pieces in molten salt immersion corrosion test.

Table 5, FIG. 1, FIG. 2 and FIG. 3 show the test results of evaluation of properties of the alloys used in this embodiment. Table 5 shows a list of the results. FIG. 1 shows creep rupture periods at 1255 K and 138 MPa; FIG. 2 shows oxidation losses in high-temperature oxidation tests; and FIG. 3 shows corrosion losses in molten salt immersion corrosion tests, FIGS. 1 to 3 being all bar graphs.

TABLE 5

| Category | Alloy Number | Creep rupture Strength 1255 K-137 MPa | Oxidation loss (mg/cm$^2$) | Corrosion loss (mg/cm$^2$) |
|---|---|---|---|---|
| Embodiment Alloy | A1 | 237.1 | −75.5 | −8.73 |
| | A2 | 242.9 | −76.4 | −9.20 |
| | A3 | 230.8 | −77.4 | −8.86 |
| | A4 | 236.5 | −76.4 | −5.70 |
| | A5 | 255.5 | −76.2 | −7.82 |
| | A6 | 228.3 | −84.8 | −10.56 |
| | A7 | 242.6 | −84.5 | −10.78 |
| | A8 | 247.4 | −83.4 | −7.70 |
| | A9 | 239.8 | −79.7 | −6.01 |
| | A10 | 258.2 | −70.1 | −6.64 |
| | A11 | 244.4 | −75.5 | −7.06 |
| | A12 | 251.2 | −79.2 | −6.99 |
| Comparative Alloy | B1 | 158.7 | −77.4 | −154.13 |
| | B2 | 100.5 | −59.7 | −21.65 |
| | B3 | 94.8 | −77.2 | −10.08 |
| | B4 | 191.6 | −150.5 | −18.56 |
| | B5 | 207.2 | −125.0 | −7.21 |
| | B6 | 81.2 | −70.1 | −17.41 |
| | B7 | 60.5 | −48.9 | −18.74 |
| | B8 | 199.4 | −109.0 | −8.28 |
| | B9 | 78.8 | −46.4 | −20.24 |
| | B10 | 76.4 | −80.0 | −21.21 |
| Known Alloy | C1 | 201.1 | −27.5 | −215.76 |
| | C2 | 188.3 | −209.6 | −15.66 |
| | C3 | 136.3 | −115.1 | −19.06 |
| | C4 | 280.3 | −29.4 | −229.96 |

As is apparent from Table 5, though having slightly low oxidation resistance, Embodiment Alloys A1 to A12 according to the present invention show somewhat superior creep rupture strength in terms of creep rupture period than Known Alloy C1. In addition, they have a significantly reduced corrosion loss and thereby show significantly improved corrosion resistance. The superalloys according to the present invention (Embodiment Alloys) contain larger amounts of Ti than Known Alloy C1 does, to thereby have improved resistance to molten salt corrosion. However, if the Ti content is simply increased, the alloy composition becomes out of balance to cause precipitation of heterogeneous phases. Accordingly, the Al content is reduced to a maximum content at which no heterogeneous phase precipitates, so as to suppress significant decrease in oxidation resistance. They have improved oxidation resistance by reducing the content of Mo that lowers the oxidation resistance. A reduced Mo content, however, lowers the high-temperature creep strength. To avoid this and to maintain satisfactory high-temperature creep strength, the Co content is reduced and W and Ta are added in corresponding amounts.

A comparison with another Known Alloy C2 demonstrates that Embodiment Alloys A1 to A12 have improved creep strength, corrosion resistance, and oxidation resistance. Specifically, they have somewhat excellent creep rupture strength, significantly improved oxidation resistance in terms of oxidation loss, and improved corrosion resistance. Among these properties, oxidation resistance is remarkably improved. The superalloys according to the present invention (Embodiment Alloys) contain a significantly reduced amount of Mo as compared to Known Alloy C2, so as to improve the oxidation resistance. Such a reduced Mo content, however, significantly lowers the high-temperature creep strength. Thus, W and Ta are added in larger amounts, and Co is added in a smaller amount to increase the high-temperature creep strength. The superalloys further contain Nb so as to improve the high-temperature strength and hot corrosion resistance.

A comparison with Known Alloy C3 demonstrates that Example Alloys A1 to A12 have improved creep strength, corrosion resistance, and oxidation resistance. Specifically, they show less oxidation loss and less corrosion loss, thereby have improved corrosion resistance and improved oxidation resistance, and have a creep rupture period about 2 times that of Known Alloy C3. Specifically, the superalloys according to the present invention (Embodiment Alloys) have a significantly reduced Mo content as compared to Known Alloy C3 and have an Al content increased to a maximum content at which no heterogeneous phase precipitates, so as to improve the oxidation resistance. They contain Co in a smaller amount and W and Ta in corresponding larger amounts to increase the high-temperature creep strength. They further contain Nb in order to improve high-temperature strength and hot corrosion resistance.

A comparison with Known Alloy C4 demonstrates that, although having somewhat shorter creep rupture period (inferior creep rupture strength) and somewhat inferior oxidation resistance, Embodiment Alloys A1 to A12 have a significantly reduced corrosion loss and thereby show significantly improved resistance to molten salt corrosion. Specifically, the superalloys according to the present invention (Embodiment Alloys) have a significantly increased Ti content than that of Known Alloy C4, to improve the resistance to molten salt corrosion. If the Ti content in the composition of Known Alloy C4 is simply increased, the resulting alloy composition becomes out of balance significantly, and this causes remarkable precipitation of heterogeneous phases. The superalloys therefore contain Al, Mo, Ta, and Co in reduced amounts to take balance as the entire alloy. They further contain Nb to improve the high-temperature strength and hot corrosion resistance.

Specifically, these data demonstrate that the superalloys according to the present invention have significantly improved resistance to molten salt corrosion at high temperature and hot oxidation resistance without sacrificing their high-temperature creep rupture life (creep rupture strength), and that they are alloys with well-balanced creep strength, oxidation resistance and corrosion resistance.

In contrast, Comparative Alloys B1 to B10 are inferior in one or more of creep rupture strength, oxidation resistance, and corrosion resistance because their compositions are substantially near to but out of the ranges as specified in the superalloys according to the present invention.

These results demonstrate that the superalloys according to the present invention are well balanced in all the creep rupture strength, oxidation resistance and corrosion resistance, and are superior in practicability to the known alloys. A gas turbine blade is used in a gas at high temperature of 1300° C. or higher while cooling the inside with air. The blade is thereby required to have excellent creep strength, corrosion resistance and oxidation resistance. The blade receives centrifugal force due to revolutions and should have such creep strength as to endure the centrifugal force. With increasing creep strength, the amount of the cooling air can be reduced to improve the thermal efficiency. The life (service life) of the blade is affected little by the creep strength but largely by local damage due to oxidation and/or corrosion. The average metal temperature of the blade is controlled at 800° C. to 900° C. to ensure satisfactory creep strength. However, the temperature of portions where cooling is not conducted sufficiently, such as a blade tip and blade surface, are locally raised to be susceptible to damage by oxidation, to thereby significantly shorten the life of the blade. Superior oxidation resistance is therefore required to use the blade up to its designed life. The temperature of a blade dove-tail, which is embedded in a disc, is generally 500° C. or lower. The blade thereby has temperature lowering toward the dove-tail, and part of its surface is exposed to temperature at which molten salt corrosion occurs (from about 850° C. to 900° C.). In this case, a gas turbine using a clean fuel containing small amounts of impurities, such as liquefied natural gas (LNG), suffers from substantially no molten salt corrosion, whereas a gas turbine using a fuel containing large amounts of impurities suffers from corrosion damage due to molten salt corrosion, and the blade thereof has a remarkably shortened life. In extreme cases, the portion suffering from corrosion damage causes the blade to be broken. Thus, superior corrosion resistance is required to use the blade up to its designed life.

One of important features of gas turbines is that they can use a wide variety of fuels including gases and liquids. Typically, gaseous fuels include LNG and off-gas. Alloys that excel in oxidation resistance are suitable for gas turbines using LNG. In contrast, alloys for use in gas turbines using off-gases containing large amounts of impurities should excel not only in oxidation resistance but also in corrosion resistance. Exemplary liquid fuels include light oils and heavy oils, and these oils contain corrosive sulfur (S) and sodium (Na). Alloys for use in gas turbines using these fuels should excel not only in oxidation resistance but also in corrosion resistance. The installation location, operation condition, and fuel of gas turbines vary from one to another, and in order to meet these variations, material alloys for blades and nozzles should excel not only in creep strength but also in corrosion resistance and oxidation resistance. The superalloys according to the present invention excel in all the creep strength, corrosion resistance, and oxidation resistance, thereby satisfy the requirements for blades and nozzles of gas turbines, and are suitable as materials for gas turbines that can use a wide variety of fuels from gases to liquids.

Advantages of the present invention have been described while taking a conventional cast material in this embodiment. However, it is also very effective to subject the superalloys according to the present invention to uni-directional solidification to give uni-directional solidification blades. It is well known that uni-directional solidification enables significant improvements in creep rupture strength while maintaining satisfactory corrosion resistance and oxidation resistance. Specifically, the superalloys according to the present invention have alloy compositions suitable also as uni-directional solidification materials, because they contain carbon (C) and boron (B) effective for grain boundary strengthening and may contain, according to necessity, hafnium (Hf) effective for suppressing grain boundary cracks during casting.

What is claimed is:

1. A casting that is a conventional casting formed of a Ni-based conventional casting superalloy comprising: 13.1 to 16.0 percent by mass of Cr, 1.0 to 6.8 percent by mass of Co, 3.0 to 3.4 percent by mass of Al, more than 5.0 to 5.6 percent by mass of Ti, 2.0 to 4.4 percent by mass of Ta, 3.5 to 4.9 percent by mass of W, 0.1 to 0.9 percent by mass of Mo, 0.3 to 1.4 percent by mass of Nb, 0.05 to 0.20 percent by mass of C, and 0.014 to 0.02 percent by mass B, with the remainder being Ni and inevitable impurities, the conventional casting containing equiaxis grains.

2. A casting that is a conventional casting formed of a Ni-based conventional casting superalloy comprising: Cr, Co, Al, Ti, Ta, W, Mo, Nb, C, and B; and at least one selected from the group consisting of Hf, Re, Zr, O and N with the remainder being nickel (Ni) and inevitable impurities, having an alloy composition including 13.1 to 16.0 percent by mass of Cr, 1.0 to 6.8 percent by mass of Co, 3.0 to 3.4 percent by mass of Al, more than 5.0 to 5.6 percent by mass of Ti, 2.0 to 4.4 percent by mass of Ta, 3.5 to 4.9 percent by mass of W, 0.1 to 0.9 percent by mass of Mo, 0.3 to 1.4 percent by mass of Nb, 0.05 to 0.20 percent by mass of C, 0.014 to 0.02 percent by mass of B, 0 to 2.0 percent by mass of Hf, 0 to 0.5 percent by mass of Re, 0 to 0.05 percent by mass of Zr, 0 to 0.005 percent by mass of O, and 0 to 0.005 percent by mass of N, the conventional casting containing equiaxis grains.

3. The casting according to one of claims 1 and 2, wherein the alloy includes 13.6 to 15.5 percent by mass of Cr, 4.0 to 6.8 percent by mass of Co, 3.0 to 3.35 percent by mass of Al, more than 5.0 to 5.4 percent by mass of Ti, 2.5 to 4.0 percent by mass of Ta, 4.0 to 4.9 percent by mass of W, 0.5 to 0.9 percent by mass of Mo, 0.3 to 1.2 percent by mass of Nb, 0.10 to 0.18 percent by mass of C, and 0.014 to 0.02 percent by mass of B.

4. The casting according to claim 3, wherein the alloy includes 13.6 to 14.5 percent by mass of Cr, 5.0 to 6.5 percent by mass of Co, 3.1 to 3.3 percent by mass of Al, more than 5.0 to 5.2 percent by mass of Ti, 3.0 to 4.0 percent by mass of Ta, 4.4 to 4.8 percent by mass of W, 0.6 to 0.8 percent by mass of Mo, 0.4 to 0.8 percent by mass of Nb, 0.12 to 0.16 percent by mass of C, and 0.014 to 0.02 percent by mass of B.

5. The casting according to claim 2, wherein the alloy including 0 to 0.1 percent by mass of Hf, 0 to 0.1 percent by mass of Re, 0 to 0.03 percent by mass of Zr, 0 to 0.005 percent by mass of O, and 0 to 0.005 percent by mass of N.

6. A blade for a land based gas turbine comprising the casting of any one of claims 1, 2 and 5.

7. A blade for a land based gas turbine comprising the casting of claim 3.

8. A blade for a land based gas turbine comprising the casting of claim 4.

* * * * *